United States Patent
Hoshi

(10) Patent No.: US 7,880,824 B2
(45) Date of Patent: Feb. 1, 2011

(54) SURFACE EMITTING DEVICE, LIQUID CRYSTAL DISPLAY, AND OPTICAL SHEET COMBINATION

(75) Inventor: Mitsunari Hoshi, Miyagi (JP)

(73) Assignee: Sony Corporation, Tokyo (JP)

(*) Notice: Subject to any disclaimer, the term of this patent is extended or adjusted under 35 U.S.C. 154(b) by 495 days.

(21) Appl. No.: 12/047,466

(22) Filed: Mar. 13, 2008

(65) Prior Publication Data
US 2008/0225201 A1 Sep. 18, 2008

(30) Foreign Application Priority Data
Mar. 15, 2007 (JP) ............... 2007-066524
Jan. 23, 2008 (JP) ............... 2008-012543

(51) Int. Cl.
*G02F 1/1335* (2006.01)
(52) U.S. Cl. ............... 349/57; 349/118; 349/96; 349/65; 359/494; 362/620
(58) Field of Classification Search ............... 349/57, 349/65, 117, 118, 96, 62, 95, 75, 193; 362/620, 362/19, 606, 607; 359/494
See application file for complete search history.

(56) References Cited

U.S. PATENT DOCUMENTS

| | | | |
|---|---|---|---|
| 2001/0010884 A1 | 8/2001 | Guehler et al. | |
| 2004/0190138 A1* | 9/2004 | Toyomasu et al. | 359/494 |
| 2006/0138702 A1 | 6/2006 | Biernath et al. | |
| 2006/0141218 A1 | 6/2006 | Biernath et al. | |
| 2006/0141220 A1 | 6/2006 | Merrill et al. | |
| 2006/0204720 A1 | 9/2006 | Biernath et al. | |
| 2006/0274244 A1 | 12/2006 | Battiato et al. | |
| 2008/0037283 A1* | 2/2008 | Mi et al. | 362/620 |

FOREIGN PATENT DOCUMENTS

| | | |
|---|---|---|
| JP | 2000-147429 | 5/2000 |
| JP | 2002-341343 | 11/2002 |
| JP | 2002544565 | 12/2002 |
| JP | 2004168869 | 6/2004 |
| JP | 2007288573 | 11/2007 |

* cited by examiner

*Primary Examiner*—Thoi V Duong
(74) *Attorney, Agent, or Firm*—K&L Gates LLP

(57) ABSTRACT

A surface emitting device includes a light emitter, a polarizer having a transmission axis along which light emerging from the light emitter is transmitted, and an optical sheet combination disposed between the light emitter and the polarizer and composed of a plurality of optical sheets. Each of the plurality of optical sheets includes an emergent surface for causing the emergent light to emerge, a spatial structure continuously arrayed on the emergent surface, a first optical axis parallel to an extension direction of the spatial structure and having a first refractive index, and a second optical axis parallel to an array direction of the spatial structure and having a second refractive index different from the first refractive index, wherein the first or second optical axis of a smaller one of the first and second refractive indices extends almost parallel to the transmission axis of the polarizer.

15 Claims, 18 Drawing Sheets

FIG.5
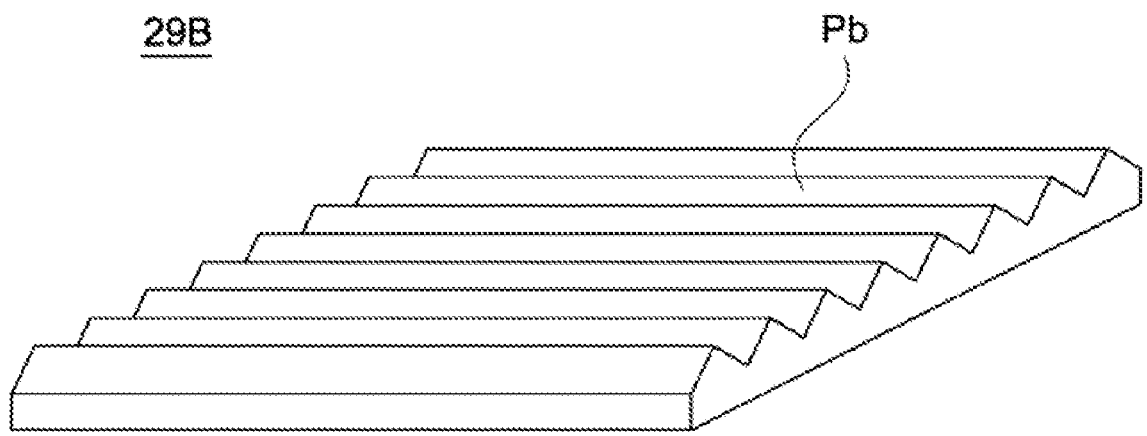
(nx>ny)
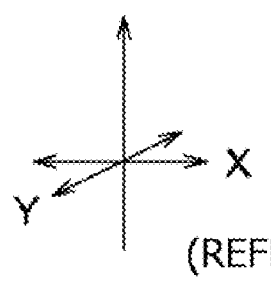
(REFRACTIVE INDEX:ny)   (REFRACTIVE INDEX:nx)

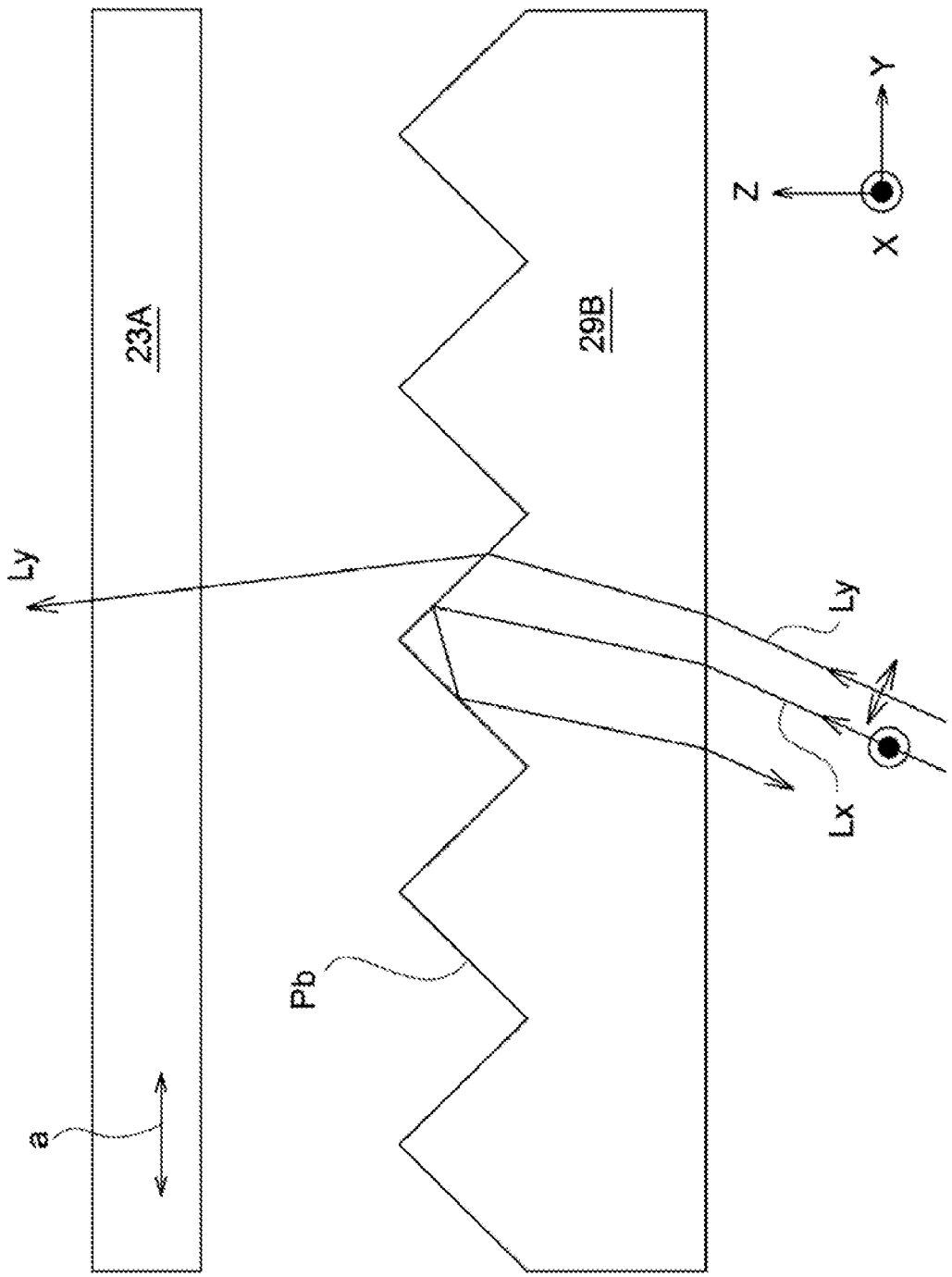

DRAWING DIRECTION

|  | | CASE 1 | CASE 2 | CASE 3 | CASE 4 |
|---|---|---|---|---|---|
| FIRST PRISM SHEET | nx1 | 1.55 | 1.80 | 1.55 | 1.80 |
|  | ny1 | 1.55 | 1.55 | 1.80 | 1.55 |
|  | nz1 | 1.55 | 1.55 | 1.55 | 1.55 |
| SECOND PRISM SHEET | nx2 | 1.55 | 1.55 | 1.80 | 1.80 |
|  | ny2 | 1.55 | 1.80 | 1.55 | 1.55 |
|  | nz2 | 1.55 | 1.55 | 1.55 | 1.55 |

FIG. 18

| | | CASE S1 | CASE S2 | CASE S3 | CASE S4 | CASE S5 | CASE P1 | CASE P2 | CASE P3 | CASE P4 | CASE P5 |
|---|---|---|---|---|---|---|---|---|---|---|---|
| | | | WHEN TRANSMISSION AXIS OF POLARIZER AND PRISM EXTENSION DIRECTION OF FIRST PRISM SHEET ARE VERTICAL | | | | | WHEN TRANSMISSION AXIS OF POLARIZER AND PRISM EXTENSION DIRECTION OF FIRST PRISM SHEET ARE PARALLEL | | | |
| FIRST PRISM SHEET | nx1 | 1.55 | 1.80 | 1.80 | 1.80 | 1.80 | 1.55 | 1.80 | 1.80 | 1.80 | 1.80 |
| | ny1 | 1.55 | 1.55 | 1.55 | 1.55 | 1.55 | 1.55 | 1.55 | 1.55 | 1.55 | 1.55 |
| | nz1 | 1.55 | 1.55 | 1.55 | 1.80 | 1.80 | 1.55 | 1.55 | 1.55 | 1.80 | 1.80 |
| SECOND PRISM SHEET | nx2 | 1.55 | 1.80 | 1.80 | 1.80 | 1.80 | 1.55 | 1.80 | 1.80 | 1.80 | 1.80 |
| | ny2 | 1.55 | 1.55 | 1.55 | 1.55 | 1.55 | 1.55 | 1.55 | 1.55 | 1.55 | 1.55 |
| | nz2 | 1.55 | 1.55 | 1.80 | 1.55 | 1.80 | 1.55 | 1.55 | 1.80 | 1.55 | 1.80 |

SURFACE EMITTING DEVICE, LIQUID CRYSTAL DISPLAY, AND OPTICAL SHEET COMBINATION

CROSS-REFERENCE TO RELATED APPLICATIONS

The present application claims priority to Japanese Patent Application No. 2007-66524 filed in the Japanese Patent Office on Mar. 15, 2007 and Japanese Patent Application No. 2008-12543 filed in the Japanese Patent Office on Jan. 23, 2008, the entire disclosures of which are incorporated herein by reference.

BACKGROUND

The present application relates to a surface emitting device, a liquid crystal display, and an optical sheet combination, all having both a light converting function and a specific polarization split function.

Liquid crystal displays (LCDs), which have lower power consumption and which can also he made smaller and thinner in structure compared with CRTs (Cathode Ray Tubes), are presently used extensively in various sizes for equipment ranging from small devices, such as portable telephones, portable game machines, digital cameras, and PDAs (Personal Digital Assistants) to great-sized liquid crystal television sets.

The LCDs are classified into a transmissive-type, a reflective-type, and the like, and particularly a transmissive-type LCD includes a liquid crystal display panel, a first polarizer (polarizer plate) disposed on a light incident side of this liquid crystal display panel, a second polarizer (polarizer plate) disposed on a light emergent side of the liquid crystal display panel, and additionally a backlight unit as a light source. There are a direct-below type backlight unit and an edge-type backlight unit. The edge light type backlight unit is constructed of a lightguide plate disposed on the back of the liquid crystal display panel, a light source disposed on one side end of this lightguide plate, a reflector plate that covers a surface opposite to a light emergent surface of the lightguide plate, and the like.

As light sources used for these types of backlight units, CCFLs (Cold Cathode Fluorescent Lamps) emitting white light have hitherto been widely used. Particularly in recent years, backlight units using LEDs (Light Emitting Diodes) as a light source are considered potential for mobile applications such as portable telephones.

In displays for mobile applications, a proper level of luminance in the front direction is required, and techniques for restricting a backlight emerging direction to the front direction have been adopted therefor. For example, in order to align the backlight emerging direction with the front direction, it is known to arrange an optical sheet called a brightness enhancement film or brightness enhancement sheet between a backlight unit and a liquid crystal display panel (see Japanese Unexamined Patent Application Publication (Translation of PCT Application) No. 2002-544565 (Patent Document 1) and Japanese Unexamined Patent Application Publication No. 2004-168869 (Patent Document 2)).

The brightness enhancement film is formed of a prim sheet having triangular prisms cyclically arrayed at a small pitch on one surface thereof, and has a function of converting backlight's light by directing them toward the front. Particularly, configurations are known, in which two prism sheets are stacked one upon another with their prism extension directions oriented orthogonal to each other, and in which a reflective polarizer sheet is disposed on a prism sheet, the reflective polarizer sheet transmitting one linear polarized component therethrough and reflecting the other linear polarized component therefrom (see Patent Document 1).

The prism sheet is formed typically by laminating curable resin layers, formed of an active energy beam-curable resin, on a surface of a transparent substrate (see Patent Document 2).

In the displays for mobile applications, there is an increasing demand for reduction in the thickness of the display as a whole and higher image quality in recent years. However, the reflective polarizer sheet used to enhance the front luminance is expensive, thereby elevating the manufacturing cost of a liquid crystal display. In addition, use of the reflective polarizer sheet increases the number of sheets, thereby preventing the reduction in the thickness of the liquid crystal display. Furthermore, even using the reflective polarizer sheet, a part of polarized component in an absorption axis direction of a first polarizer is leaked, whereby the function is not always be enough.

SUMMARY

Accordingly, it is desirable So provide a surface emitting device, a liquid crystal display, and an optical sheet combination, all enabling a reduction in the number of optical sheets required to enhance the front luminance, while having both a light-gathering function and a specific polarization split function.

In accordance with an embodiment, there is provided a surface emitting device which includes a light emitter, a polarizer having a transmission axis along which light emerging from the light emitter is transmitted, and an optical sheet combination disposed between the light emitter and the polarizer and composed of a plurality of optical sheets. Each of the plurality of optical sheets includes an emergent surface for causing the emergent light to emerge therefrom, a spatial structure continuously arrayed on the emergent surface, a first optical axis parallel to an extension direction of the spatial structure and having a first refractive index, and a second optical axis parallel to an array direction of the spatial structure and having a second refractive index different from the first refractive index. The first or second optical axis of a smaller one of the first and second refractive indices extends almost parallel to the transmission axis of the polarizer.

In accordance with another embodiment, there is provided a liquid crystal display which includes a liquid crystal display panel, a light emitter for illuminating the liquid crystal display panel, a first polarizer disposed on a light incident side of the liquid crystal display panel and having a transmission axis along which light emerging from the light emitter is transmitted, a second polarizer disposed on a light emergent side of the liquid crystal display panel, and an optical sheet combination disposed between the first polarizer and the light emitter and composed of a plurality of optical sheets. Each of the plurality of optical sheets includes an emergent surface for causing the light to emerge therefrom, a spatial structure continuously arrayed on the emergent surface, a first optical axis parallel to an extension direction of the spatial structure and having a first refractive index, and a second optical axis parallel to an array direction of the spatial structure and having a second refractive index different from the first refractive index. The first or second optical axis of a smaller one of the first and second refractive indices extends almost parallel to the transmission axis of the polarizer.

In accordance with a still another embodiment, there is provided an optical sheet combination is composed of a plurality of optical sheets, and each of the plurality of optical sheets includes an emergent surface for causing an emergent light from a light emitter, a spatial structure continuously arrayed on the emergent surface, a first optical axis parallel to an extension direction of the spatial structure and having a first refractive index, and a second optical axis parallel to an array direction of the spatial structure and having a second refractive index different from the first refractive index. The first or second optical axis of a smaller one of the first and second refractive indices extends almost parallel to the transmission axis of the polarizer.

According to an embodiment, the optical sheet has different refractive indices in the extension direction of the spatial structure and in the array direction orthogonal thereto, respectively. With this configuration, the optical sheet can be provided with different transmission characteristics in a polarized component oscillating in the extension direction of the spatial structure and in a polarized component oscillating in the array direction of the spatial structure, with respect to light incident on the optical sheet. For example, by making the refractive index in the extension direction of the spatial structure greater than the refractive index in the array direction of the spatial structure, the amount of emergent light of the polarized component oscillating in the array direction of the spatial structure of the light incident on the optical sheet can be made greater. This difference in the transmission characteristic between the polarized components increases with increasing difference between the refractive indices in the extension direction of the spatial structure and in the array direction.

Accordingly, the optical sheet has not only a light-distribution control function but also a specific polarization split function in the spatial structure. By combining a plurality of optical sheets such that their optical axes along which the refractive index is smaller of their in-plane anisotropic optical axes are oriented in the same direction, the light-distribution control function and the polarization split function can he further enhanced. Furthermore, by arranging the optical axis having a smaller refractive index in each of the optical sheets in the same direction as that of the transmission axis of the polarizer, the amount of light transmitted through the polarizer can be increased, thereby making it possible to improve the front luminance.

The spatial structure may be formed of a prism or a lenticular lens. By forming the spatial structure of a light-gathering structure such as a prism, it is possible to perform such light-distribution control as to enhance the front luminance.

Preferably, the optical sheet combination is formed of a first optical sheet in which the refractive index in the extension direction of the spatial structure is smaller than the refractive index in the array direction of the spatial structure, and a second optical sheet in which the refractive index in the extension direction of the spatial structure is greater than the refractive index in the array direction of the spatial structure. As a result of such a configuration, the respective extension directions of the spatial structure can be made to intersect (orthogonal to) each other, while orienting the respective optical axes of the first and second optical sheets in the same direction, thereby enabling realization of a significant enhancement, especially, of the front luminance.

Thus, polarization control and light-distribution control permit the enhancement of the front luminance of the light emitter using a polarizer. For polarization control, it is preferable that the difference between the refractive index in the extension direction of the spatial structure and that in the array direction be greater, in the first and second optical sheets. For light-distribution control, it is preferable that the value of a smaller one of the refractive indices in the extension direction of the spatial structure and in the array direction is rather greater; specifically, it is preferable that the smaller refractive index is not less than 1.50. Furthermore, for both the polarization control function and the light-distribution control function, it is most preferable that spatial structure is an isosceles triangular prism in cross section with a vertical angle of 90 degrees.

The optical sheets according to an embodiment may he fabricated by subjecting a resin sheet having a spatial structure such as prism formed on a surface thereof, to a drawing process in the extension direction of the spatial structure. A reason for drawing the resin sheet in the extension direction of the spatial structure is to reduce fluctuations in optical characteristics due to any geometrical change (collapse) in the spatial structure before and after the drawing.

In this case, the first optical sheet may be composed of a resin material (resin sheet) in which the refractive index is small in the extension direction. Furthermore, the second optical sheet may he composed of a resin material (resin sheet) in which the refractive index is great in the extension direction. The resin sheet for forming the first optical sheet may include methacrylic resins, polystyrene resins, styrene-methyl methacrylate copolymers, or mixtures thereof. The resin sheet for forming the second optical sheet may include PET (Polyethylene Terephthalate), PEN (Polyethylene Naphthalate), or mixtures thereof, or PET-PEN copolymers.

When a surface emitting device or a liquid crystal display is formed by arranging the optical sheet combination according to embodiments between the light emitter and the polarizer, the specific polarization split function is obtained in addition to the light-distribution control function such as the light-gathering function, so that it becomes possible to eliminate the reflective polarizer sheet hitherto used. As a result, it becomes possible to reduce the number of optical sheets required to enhance the front luminance, and also to realize a reduction in the thickness of the surface emitting device or the liquid crystal display.

As described above, according to an embodiment, a plurality of optical sheets having refractive index anisotropy in the extension direction of the spatial structure and in the array direction, are combined, so that not only the light-distribution control function such as the light-gathering function, but also the specific polarization split function can be obtained. As a result, even without using an expensive optical element such as a reflective polarizer sheet, it becomes possible to increase the luminance enhancement effect of the liquid crystal display, and also to achieve reductions in the number of parts and in the manufacturing cost.

Additional features and advantages are described herein, and will be apparent from the following Detailed Description and the figures.

BRIEF DESCRIPTION OF THE FIGURES

FIG. 5 is a schematic perspective view showing a configuration of a second prism sheet forming the optical sheet combination according to an embodiment;

FIG. 7 is a schematic side view for illustrating a relationship between the first polarizer and a second prism sheet of FIG. 6;

FIG. 18 is a diagram showing simulation conditions for the surface emitting devices of FIGS. 16 and 17.

DETAILED DESCRIPTION

Embodiment of the present application will now he described with reference to the drawings.

First Embodiment

Figure 1:
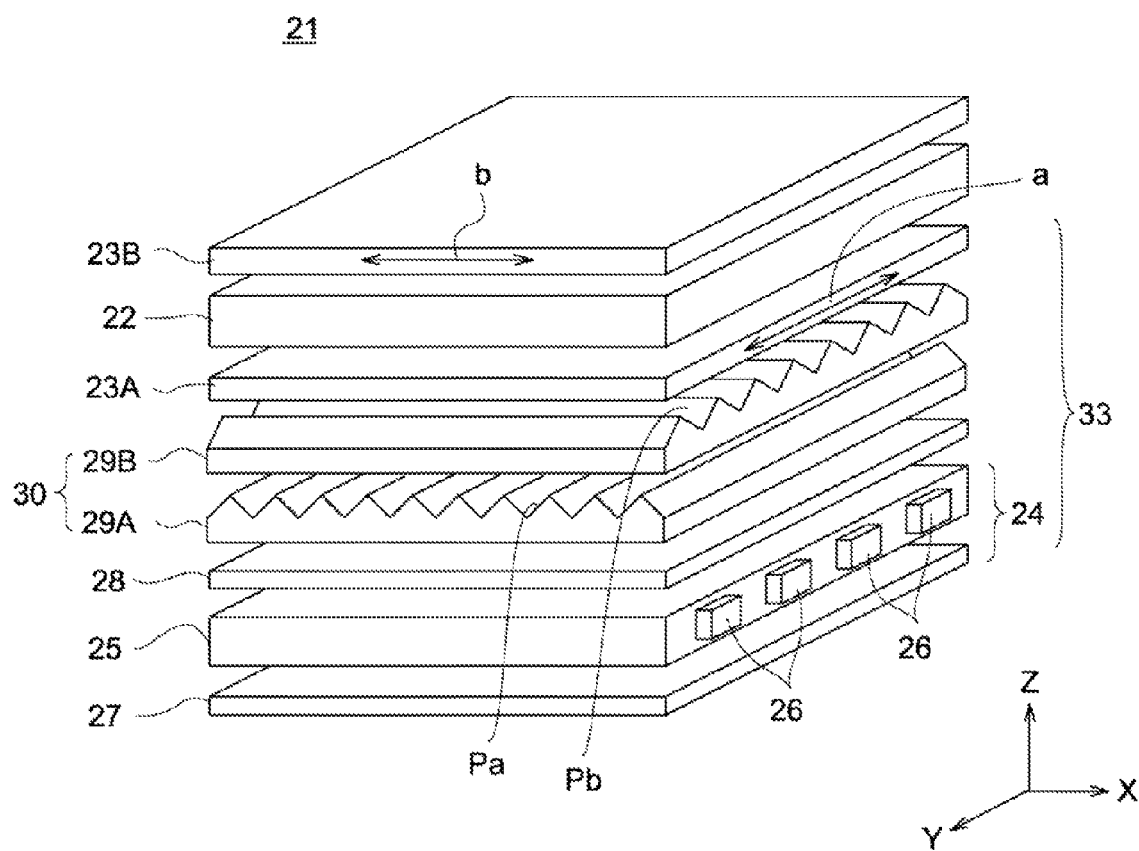
FIG. 1 is a perspective view showing a schematic configuration of a liquid crystal display according to a first embodiment.

FIG. 1 is a perspective view schematically showing a configuration of a liquid crystal display 21 having an optical sheet combination 30 according to a first embodiment. First, the overall configuration of this liquid crystal display 21 will be described.

The liquid crystal display 21 of an embodiment includes a liquid crystal display panel 22, a second polarizer (polarizer plate) 23B disposed on a light emergent side of the liquid crystal display panel 22, and a surface emitting device 33 for illuminating the liquid crystal display panel 22. The surface emitting device (backlight unit) 33 includes a light emitter 24, a diffuser sheet 28, the optical sheet combination 30 according to an embodiment, and a first polarizer (polarizer plate) 23A disposed on a light incident side of the liquid crystal display panel 22.

The liquid crystal display panel 22 has a structure in which a liquid crystal layer is sandwiched between a pair of transparent substrates. The driving mode of the liquid crystal display panel 22 is not particularly limited, but may include a VA (Vertical Alignment), an IPS (In-Plane Switching), a TN (Twisted Nematic), and other modes. The liquid crystal display panel 22 may have a phase difference film and the like properly provided which optically compensate for the birefringence of the liquid crystal layer and the like, if necessary.

The first polarizer 23A has a transmission axis a along which light emerging from the light emitter 24 is transmitted. The transmission axis a is set in a Y-axis direction of FIG. 1, whereas a transmission axis b of a second polarizer 23B is set in an X-axis direction of FIG. 1. Here, the X axis and the Y axis are two axes orthogonal to each other in a display surface of the liquid crystal display panel 22, whereas a Z axis is an axis orthogonal to the X axis and the Y axis and parallel to a thickness direction of the liquid crystal display 21.

While the light emitter 24 shown in the drawing is of an edge light type backlight unit, it may also be of a direct type backlight unit. The light emitter 24 includes a lightguide plate 25 made of a transmissive material, a light source 26 disposed on one side end of the lightguide plate 25, a reflector plate 27 that covers a surface opposite to a light emergent surface of the lightguide plate 25, and the like. The light source 26 is composed of a plurality of point light sources such as LEDs in an example shown in the drawing. However, one or more linear light sources, such as fluorescent tubes, may alternatively be used. Furthermore, a source of surface light such as organic EL may further be used as the light emitter 24.

Between the lightguide plate 25 and the first polarizer 23A, the diffuser sheet 28, a first prism sheet 29A, and a second prism sheet 29B are disposed in order of mention from a lightguide plate 25 side. The diffuser sheet 28 has a function of diffusing light emergent from the lightguide plate 25 over a predetermined range of angles, and is provided to make a luminance distribution of the light emitter 24 uniform. The first prism sheet 29A and the second prism sheet 29B correspond to a first optical sheet and a second optical sheet according to embodiments which form the optical sheet combination 30, respectively, and functions as a luminance enhancement sheet that converges light emergent from the diffuser sheet 28 toward the front of the liquid crystal display panel 22 to enhance the front luminance.

The following describes details of the first and second prism sheets 29A, 29B according to embodiments which constitute the optical sheet combination combination 30.

The first prism sheet 29A and the second prism sheet 29B are formed by continuously arraying a plurality of prisms Pa, Pb, each having a spatial structure, on light emergent surfaces thereof, and disposed with prism forming surfaces thereof facing the liquid crystal display panel 22, respectively. The prism sheets 29A, 29B are stacked one upon another such that ridgeline directions (extension directions) of the respective prisms Pa, Pb are orthogonal to each other. The prism sheets 29A, 29B may be integrated through an adhesive layer. In this case, the adhesive layer may preferably be a transparent material having a refractive index lower than those of the prism sheets 29A, 29B.

The respective prisms Pa, Pb is formed of a triangular prismatic body, but the vertical angle, altitude, arraying pitch, and the like are not particularly limited. The respective prisms Pa, Pb may have different vertical angles, altitudes, arraying pitches, and the like. The spatial structure is not limited to the prismatic body as described above, but may be formed of a lenticular lens body such as a cylindrical lens.

Each of the first and second prism sheets 29A, 29B has different refractive indices in an optical axis (first optical axis) parallel to the extension direction (hereinafter also called "prism extension direction") of its prisms Pa or Pb and in an optical axis (second optical axis) parallel to their array direction (hereinafter also called "prism array direction"). By providing the respective prism sheets 29A, 29B with in-plane anisotropy with respect, to refractive index in this way, the transmission characteristics of light incident on the respective prism sheets 29A, 29B can be varied responsive to a state of polarization.

Figure 2:
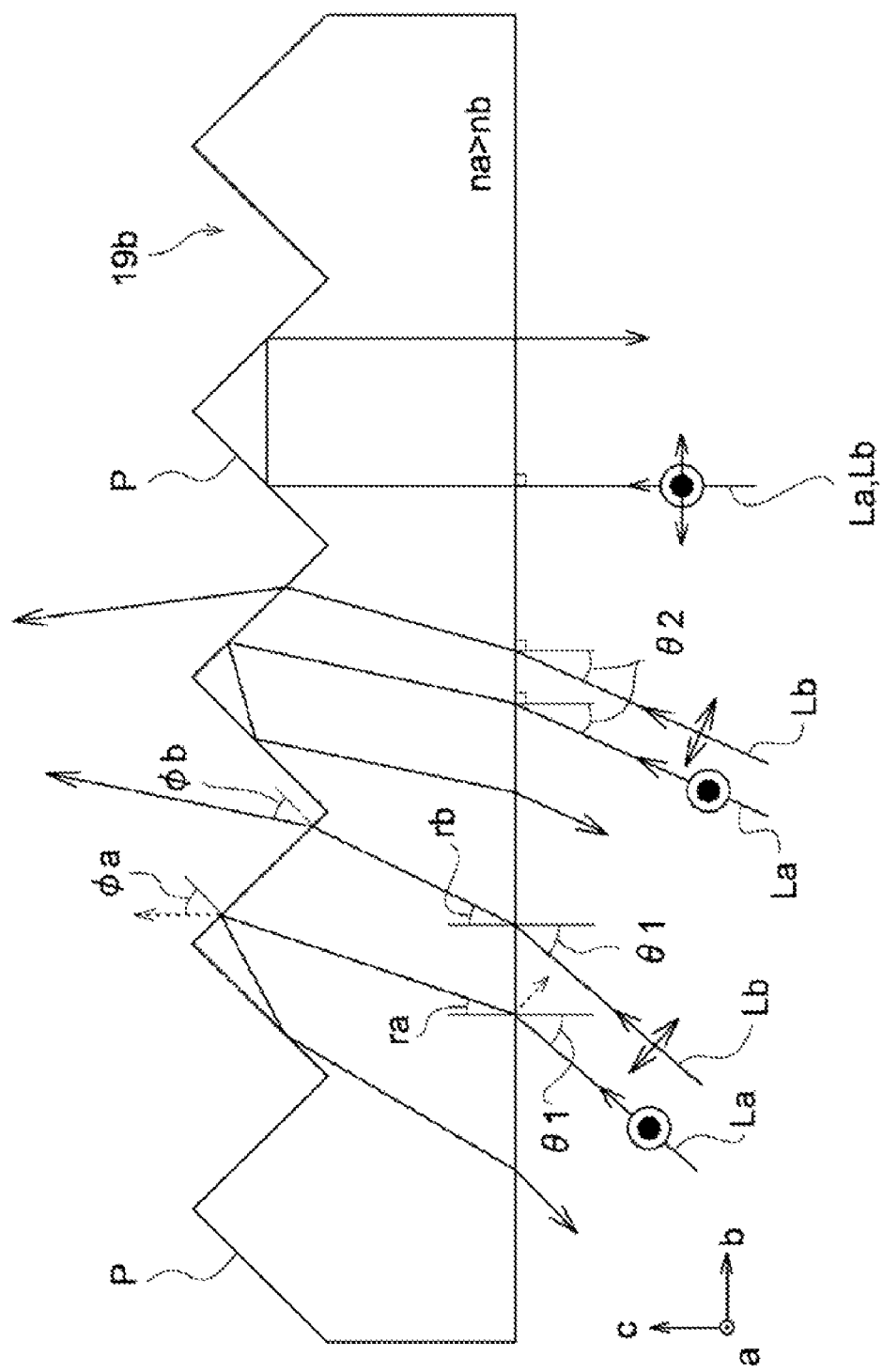
FIG. 2 is a diagram for illustrating passages of light transmitting through a prism sheet in which a refractive index in a prism extension direction is greater than a refractive index in a prism array direction.
Figure 3:
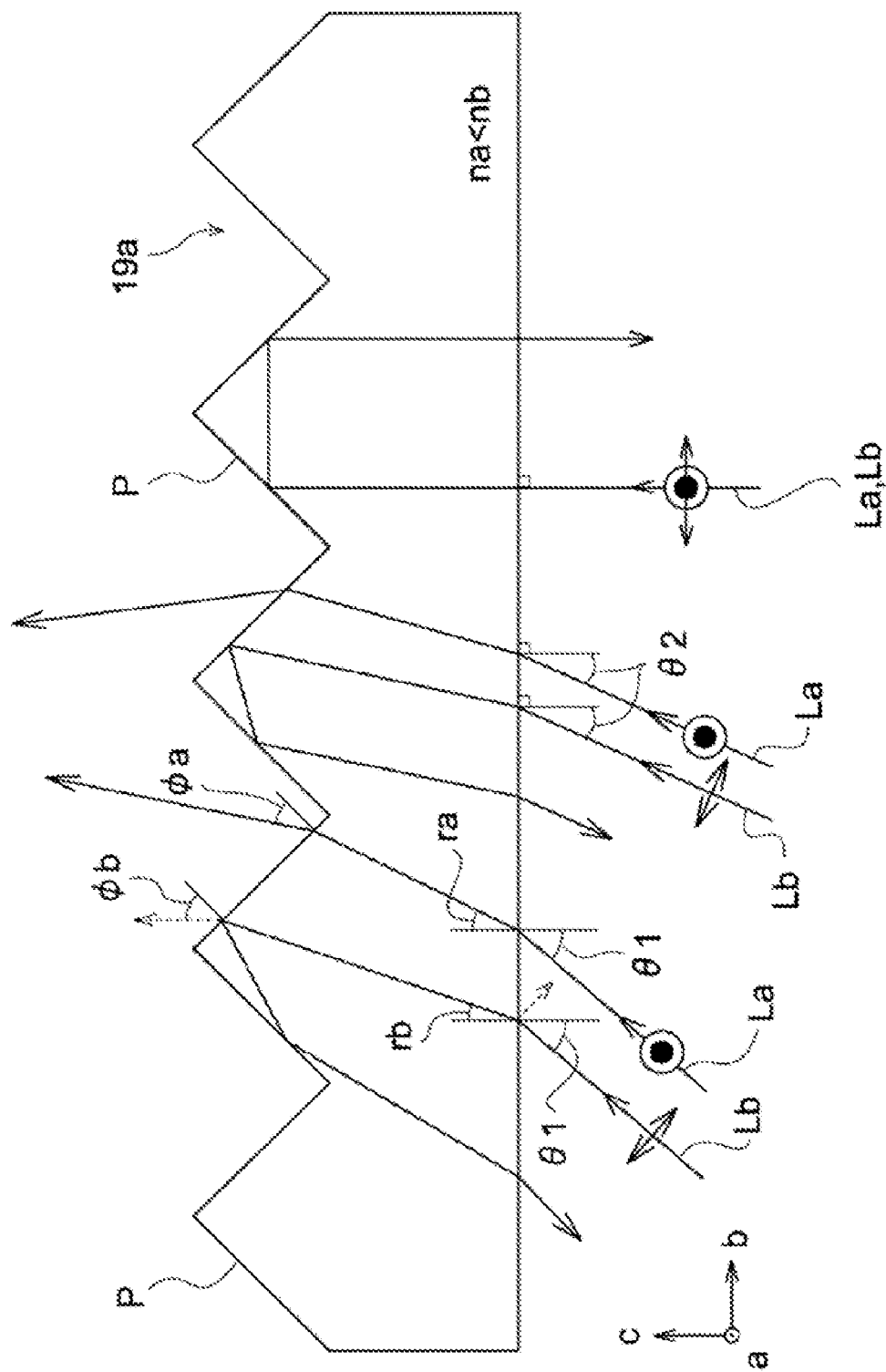
FIG. 3 is a diagram for illustrating passages of light transmitted through a prism sheet in which the refractive index in the prism array direction is greater than the refractive index in the prism extension direction.

Referring here to FIGS. 2 and 3, a description will be given of differences in the transmission characteristics of incident light responsive to states of polarization, using an example in which a refractive index (first refractive index) in the prism extension direction is greater than a refractive index (second refractive index) in the prism array direction.

FIGS. 2 and 3 schematically show passages of light transmitted through prism sheets, each having a large number of prisms P arrayed continuously on surfaces thereof, respectively. A prism forming surface being an upper surface side of the prism sheet is a light emergent surface, whereas a flat surface being its lower surface side is a light incident surface. An axis a denotes the extension direction of the prisms P, an axis b denotes the array direction of the prisms P, and an axis c denotes a thickness direction of prism sheets 19a, 19b. A reference symbol La denotes a polarized component oscillating in the prism extension direction, of backlight rays L, whereas Lb denotes a polarized component oscillating in the prism array direction of the backlight rays. Here, the prism sheet 19b shown in FIG. 2 has a refractive index (na) in the prism extension direction greater than a refractive index (nb) in the prism array direction (na>nb). Furthermore, the prism sheet 19a shown in FIG. 3 has the refractive index (na) in the prism extension direction smaller than the refractive index (nb) in the prism array direction (na<nb).

Referring to FIG. 2, backlight's light incident upon the light incident surface of the prism sheet 19b obliquely at an incident angle θ1 have the polarized components La and Lb refracted at different refractive angles ra, rb (ra<rb), and the refracted components emerge from an oblique surface of each prism at emergent angles φa, φb, respectively, since the prism sheet 19b has different refractive indices in the extension direction and in the array direction of the prism P, respectively. At this time, the emergent angle φb of the polarized component Lb is smaller than the emergent angle φa of the polarized component La(φa>φb).

In the above embodiment, both the polarized components La, Lb emerge from the light emergent surface (prism forming surface). However, since the prism sheet 19b has different refractive indices in the prism extension direction and in the prism array direction, respectively, the polarized components oscillating in these respective directions are reflected at different reflectance at boundaries such as the light incident surface and the prism oblique surface of the prism sheet 19b. Namely, in this embodiment, the polarized component La oscillating in the prism extension direction reflects more than the polarized component Lb. As a result, for the backlight's light transmitted through the prism sheet 19b, the polarized component Lb is greater than the polarized component La in terms of the amount of light.

Furthermore, the emergent angles of the polarized components La, Lb emerging from the prism oblique surface bear a relationship φa>φb. Thus, when an incident angle of backlight's light entering the prism sheet 19b satisfies certain conditions, a complete polarization separated state can be achieved in which the polarized component La repeats total reflection at the prism oblique surface to become a returned light, and only the polarized component Lb is transmitted through the prism sheet 19b. How this example is established under a condition of an incident angle θ2 is shown in FIG. 2. A specific example of θ2 is about 11 to 25 degrees under conditions: na=1.9; nb=1.6; and a vertical angle of the prism P of 90 degrees.

It is noted that if an incident angle of backlight's light with respect to the prism sheet 19b is too small, this is a state equal to a case where the backlight's light enters the light incident surface of the prism sheet 19b vertically. In this case, as shown in FIG. 2, the backlight's light L repeats total reflection at the oblique surface of each prism P to become returned light that returns toward the backlight unit irrespective of any stale of polarization.

The polarized light of the returned light returned toward the backlight unit is depolarized by the diffusion effect of the diffuser sheet 28 and the reflection of the reflector plate 27, and re-enters the prism sheet 19b in the unpolarized state. By repeating this, even in a final stage, the polarized component Lb becomes greater than the polarized component La in terms of the amount of light.

Conversely, as shown in FIG. 3, when the refractive index in the prism extension direction is smaller man the refractive index in the prism array direction, the emergent angle φb of the polarized component Lb is smaller than the emergent angle φa of the polarized component La (φa<φb). Namely, in this embodiment, the polarized component Lb oscillating in the prism array direction reflects more than the polarized component La, so that for backlight's light transmitted through the prism sheet 19a, the polarized component La is greater than the polarized component Lb in terms of the amount of light.

The polarized light of the returned light returned toward the backlight unit is depolarized by the diffusion effect of the diffuser sheet 28 and the reflection of the reflector plate 27, and re-enters the prism sheet 19a in the unpolarized state. By repeating this, even in a final stage, the light amount of the polarized component La becomes greater than that of the polarized component Lb.

Figure 4:
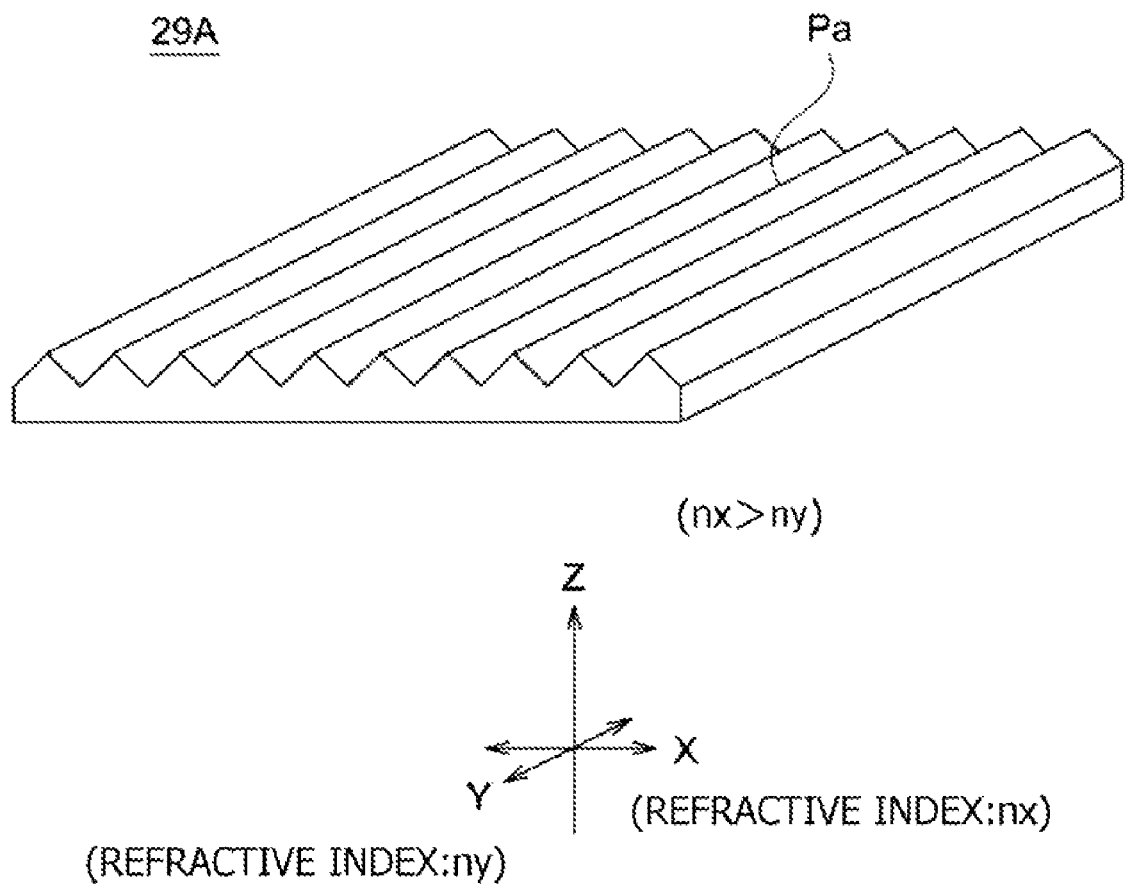
FIG. 4 is a schematic perspective view showing a configuration of a first prism sheet forming an optical sheet combination according to an embodiment.

In an embodiment, the first prism sheet 29A is formed, as shown in FIG. 4, such that the refractive index in the extension direction (Y-axis direction) of the prisms Pa is smaller than the refractive index of the array direction (X-axis direction) of the prisms Pa (equivalent to the prism sheet 19a of FIG. 3). Furthermore, the second prism sheet 29B is formed, as shown in FIG. 5, such that the refractive index in the extension direction (X-axis direction) of the prisms Pb is greater than the refractive index of the array direction (Y-axis direction) of the prisms Pb (equivalent, to the prism sheet 19b of FIG. 2).

In the optical sheet combination 30 of an embodiment, the first and second prism sheets 29A, 29B are disposed such that their optical axes (hereinafter called "low refractive index side optical axes") along which the refractive index is smaller of the in-plane anisotropic optical axes are oriented in the same direction, respectively. With this configuration, polarization split characteristics of backlight's light transmitted through the prism sheets 29A, 29B are enhanced.

Figure 6:
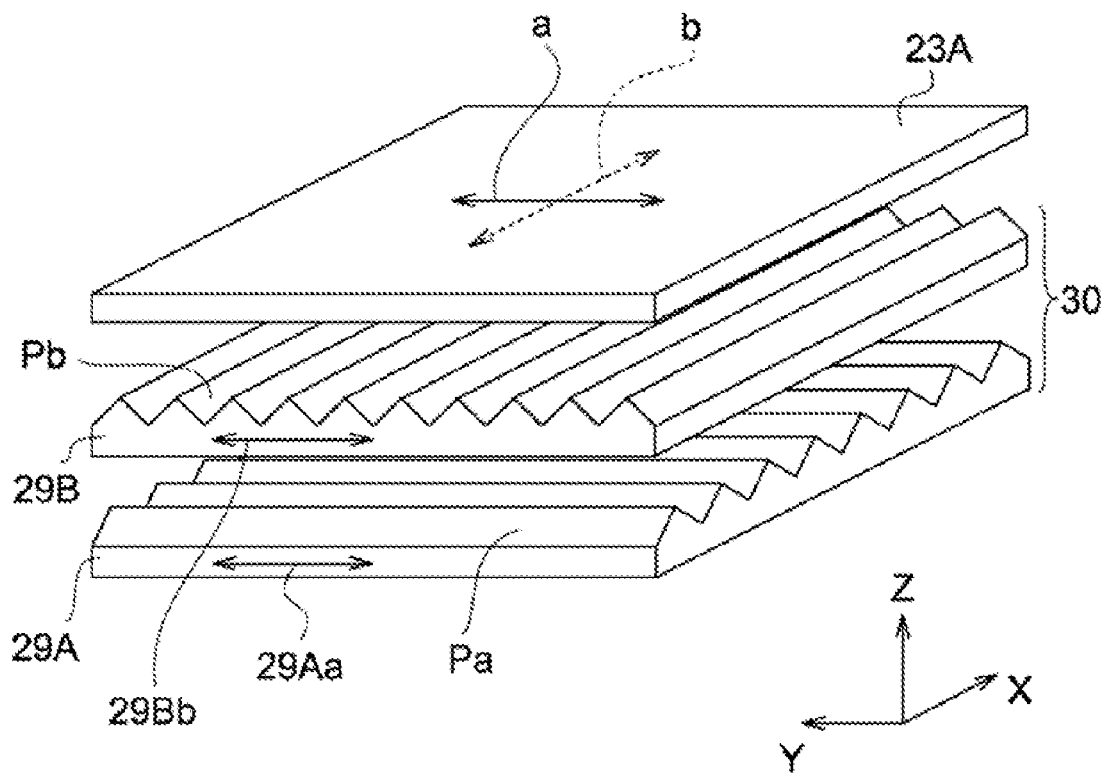
FIG. 6 is a perspective view for illustrating a relationship between an optical sheet combination and a first polarizer according to a first embodiment.

FIG. 6 is a perspective view for illustrating a relationship between the optical sheet combination 30 and the first polarizer 23A, and FIG. 7 is a schematic side view for illustrating a relationship between the first polarizer 23A and the second prism sheet 29B. As shown in FIG. 6, a low refractive index side optical axis 29Aa of the first prism sheet 29A extends in the extension direction of the prisms Pa, whereas a low refractive index side optical axis 29Bb of the second prism sheet 29B extends in the array direction of the prisms Pb. FIG. 6 shows an example in which the low refractive index side optical axes 29Aa, 29Bb are disposed oriented in the same direction (Y-axis direction in FIG. 6). In this case, the prism extension directions are the prism array directions of the prism sheets 29A, 29B intersect (are orthogonal to) each other, respectively. With this configuration, backlight's light transmitted through each of the prism sheets 29A, 29B are converged efficiently toward the front.

Furthermore, in an embodiment, as shown, in FIGS. 1 and 6, the low refractive index side optical axes 29Aa, 29Bb of the first and second prism sheets 29A, 29B are disposed almost parallel to the transmission axis a of the first polarizer 23A disposed on the light incident side of the liquid crystal display panel 22. The term "almost parallel" herein used is intended to mean a case where the low refractive index side optical axes 29Aa, 29Bb are parallel to the direction of the transmission axis a, and also any virtually parallel state including a state slightly off the parallel state. With this configuration, the light amount of backlight's light separated by polarization by the first and second prism sheets 29A, 29B which enter the liquid crystal display panel 22 is increased, thereby making it possible to enhance the front luminance.

An example of a manufacturing method for the first and second prism sheets 29A, 29B thus formed will be described next.

The first and second prism sheets 29A, 29B of an embodiment each are manufactured by performing a step of molding a resin sheet having a prismatic structure surface formed on one surface, and a step of drawing the resin sheet in the prism extension direction to cause the resin sheet to have different refractive indices in the prism extension direction and in the prism array direction, respectively.

The molding method of the resin, sheet is not particularly limited. For example, a heat pressing method, a fusion extruding method, and the like may be applicable. Furthermore, using a flat resin sheet as a base, a prismatic layer may he fabricated on the fiat resin sheet. It is preferable that resin sheet is fabricated continuously by a rolling method.

Figure 8A:
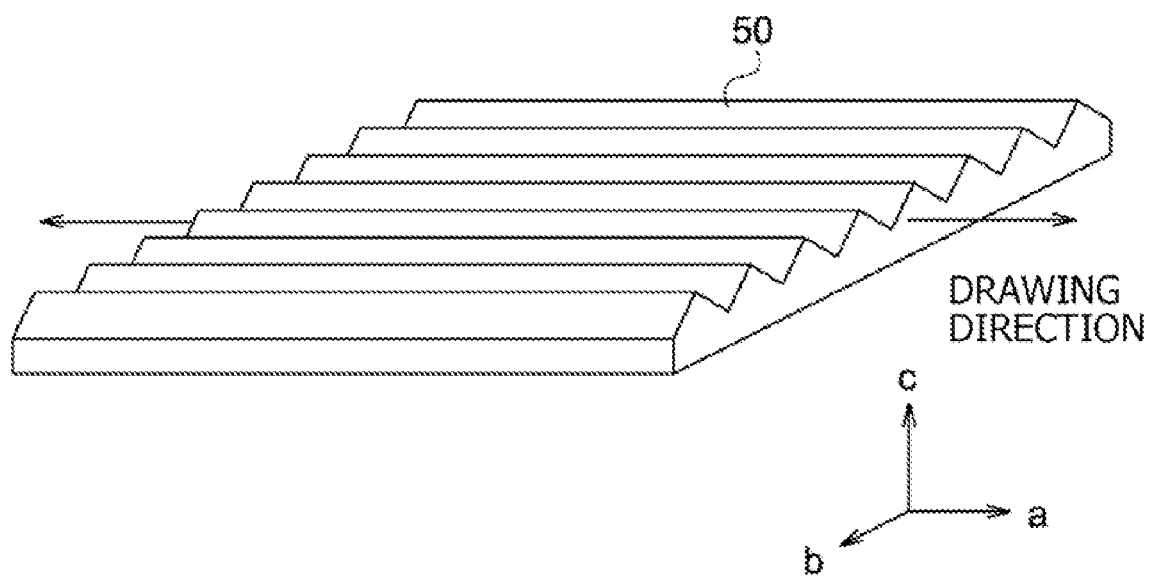
FIGS. 8A and 8B are schematic diagrams for illustrating a manufacturing method for a prism sheet having in-plane refractive index anisotropy.
Figure 8B:
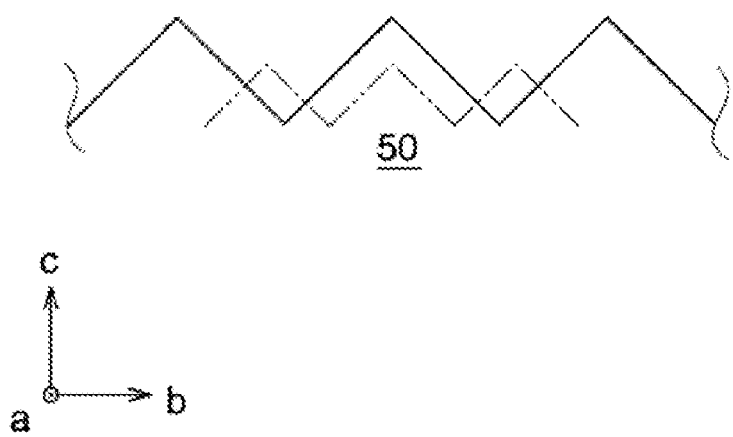

The refractive index anisotropy is imparted to the fabricated resin sheet by drawing it in the prism extension direction. A drawing step for a resin sheet is schematically shown in FIGS. 8A and 8B. As shown in FIG. 8A, a resin sheet 50 is drawn in the prism extension direction. A drawing rate is appropriately set according to the intended prismatic shape, in-plane refractive index difference, and the like.

A reason why the drawing direction is set along the prism extension direction is to suppress intended optical characteristics from being changed by a prismatic shape fluctuating before and after the drawing. FIG. 8B shows a change in the external shape of the prismatic structure surface before and after the drawing, in which a solid line shows a state before the drawing, and a long-and-short dashed line shows a state after the drawing. The drawing direction is set along the prism extension direction (a-axis direction), so that a prismatic sectional shape after the drawing substantially becomes a similarly reduced shape of a prismatic sectional shape before the drawing. Thus, fluctuations in the optical characteristics are suppressed, thereby making it possible to control the required prismatic shape, altitude, arraying pitch, and the like highly accurately.

In this embodiment, the first prism sheet 29A is formed such that the refractive index in the prism extension direction is smaller than the refractive index in the prism array direction. For this reason, as a resin sheet for forming the first prism sheet 29A, a resin material whose refractive index becomes small in the drawing direction is used. The resin material whose refractive index becomes small in the drawing direction includes methacrylic resins such as polymethyl methacrylate, polystyrene resins, styrene-acrylonitrile copolymers (AS resins), styrene-methyl methacrylate copolymers, mixtures thereof, and the like.

Meanwhile, the second prism sheet 29B is formed such that the refractive index in the prism extension direction is greater than the refractive index in the prism array direction. For this reason, as a resin sheet for forming the second prism sheet 29B, a resin material whose refractive index becomes great in the drawing direction is used. The resin material whose refractive index becomes great in the drawing direction includes PET (Polyethylene Terephthalate), FEN (Polyethylene Naphthalate), and mixtures thereof, or copolymers such as PET-PEN copolymers, polycarbonate, polyvinyl alcohol, polyester, polyvinylidene fluoride, polypropylene, polyamide, and the like.

The magnitude of the birefringence of each of the first and second prism sheets 29A, 29B is not particularly limited. It is, e.g., not less than 0.05, preferably not less than 0.1, or more preferably, not less than 0.2. When the birefringence is greater, polarization selectivity is increased, and hence the enhancing rate of the front luminance can also be increased.

Furthermore, a resin material whose refractive index is small in the drawing direction typically exhibits smaller birefringence than a resin material whose refractive index in the drawing direction is great. Namely, greater birefringence is obtained from the resin material whose refractive index is great under the same drawing rate. Therefore, in an embodiment, it is easier to obtain great birefringence from the second prism sheet 29B than from the first prism sheet 29A.

Thus, in an embodiment, the second prism sheet 29B is disposed between the first prism sheet 29A and the first polarizer 23A. By arranging the prism sheet 29B having higher polarization selectivity on a light incident side of the first polarizer 23A in this way, the emergent light amount of a polarized component parallel to the transmission axis of the first polarizer 23A can be increased (FIG. 7).

Referring next to FIG. 1, a basic operation of the liquid crystal display 21 according to an embodiment configured described above will be described. Emergent light from the light source 26 enters the lightguide plate 25, and thereafter emerges from the upper surface (light emergent surface) of the lightguide plate 25. The light emerging from the lightguide plate 25 enters the diffuser sheet 28 to be uniformly diffused, is thereafter disposed toward the front by the optical sheet combination 30 (the first prism sheet 29A and the second prism sheet 29B), and enters the liquid crystal display panel 22 via the first polarizer 23A. The light incident upon the liquid crystal display panel 22 has a transmission amount controlled per pixel, and thereafter emerges toward a viewer via a color filter (not shown) and the second polarizer 23B. As a result, an image is displayed on a front surface of the liquid crystal display panel 22.

A function of the optical sheet combination 30 will be described below.

As shown in FIG. 6, the first prism sheet 29A and the second prism sheet 29B are disposed such that the prismatic structure surfaces face the first polarizer 23A. The extension direction (Y-axis direction) of the prisms Pa of the first prism sheet 29A and the extension direction (X-axis direction) of the prisms Pb of the second prism sheet 29B are orthogonal to each other. The low refractive index side optical axis 29Aa of the first prism sheet 29A is oriented in the extension direction (Y-axis direction) of the prisms Pa, whereas the low refractive index side optical axis 29Bb of the second prism sheet 29B is oriented in the array direction (Y-axis direction) of the prisms Pb. Arrangement directions of these low; refractive index side optical axes 29Aa, 29Bb coincide with the transmission axis a of the first polarizer 23A. It is noted that the reference symbol "b" denotes a transmission axis direction of the second polarizer 23B, which is orthogonal to the transmission axis a of the first polarizer 23A. The reference symbol "b" is also equivalent to an absorption axis of the first polarizer 23A.

In the above configuration, of light incident upon, the optical sheet combination 30, a light component travelling through an X-Z plane is polarized toward the front (Z-axis direction) as it is transmitted by refraction through prism Pa of the first prism sheet 29A. Meanwhile, a light component travelling through a Y-Z plane is polarized toward the front as it is transmitted by refraction through each prism Pb of the second prism sheet 29B. By arranging the two prism sheets orthogonally in this way, backlight's light is aligned toward the front efficiently. With this configuration, the front luminance of the liquid crystal display 21 is enhanced to be suitable for use as a liquid crystal display, especially, for mobile applications.

Furthermore, the light incident on the first prism sheet 29A has a polarized component oscillating in the Y-axis direction emerging more in terms of the amount of light than a polarized component oscillating in the X-axis direction due to the in-plane anisotropy (nx>ny) of this first prism sheet 29A. Meanwhile, the light incident on the second prism sheet 29B has a polarized component oscillating in the Y-axis direction emerging more in terms of the amount of light than a polarized component oscillating in the X-axis direction due to the in-plane anisotropy (nx>ny) of this second prism sheet 29B.

Therefore, for backlight's light (L) transmitted through the optical sheet combination 30, an emergent light amount of the polarized components (Ly) oscillating in the Y-axis direction are more than that of the polarized components (Lx) oscillating in the X-axis direction. A quantitative ratio of the polarized components Ly to the polarized components Lx depends on the magnitude of the in-plane refractive index anisotropy (birefringence) of each of the prism sheets 29A, 29B, the shapes of the spatial structure of the prism sheets 29A, 29B, the distribution of incident angles of light of the light emitter entering the prism sheets 29A, 29B, and the like.

According to the optical sheet combination 30 of an embodiment, not only the light-gathering effect; but also a specific polarization split effect can be obtained. As a result, as shown in FIG. 7, of the backlight rays emerging from the second prism sheet 29B, the emergent light amount of the polarized component Lx in the extension direction (X-axis direction) of the prisms Pb is made smaller than that of the polarized component Ly in the array direction (Y-axis direction) of the prisms Pb, thereby reducing an amount in which the first polarizer 23A absorbs the backlight rays, and hence achieving effective utilization of the backlight's light. Namely, it is possible to increase the extraction efficiency of the backlight rays and hence to enhance the front luminance.

As described above, the liquid crystal display 21 according to an embodiment, by disposing the optical sheet combination 30 between the lightguide plate 25 and the first polarizer 23A, the optical sheet combination 30 has a function similar to a currently manufactured reflective polarizer sheet in addition to the luminance enhancement effect obtained by arranging two prism sheets, thereby making it possible to eliminate the reflective polarizer sheet. As a result, the number of optical sheets required to enhance the front luminance can be decreased, thereby making it possible to decrease the total thickness of the optical sheets, and hence to sufficiently reduce the thickness of the liquid crystal display.

Furthermore, according to an embodiment, the optical sheet combination 30 is formed by arranging the second prism sheet 29B having greater birefringence than the first prism sheet 29A on the light emergent side of the first prism sheet 29A, thereby making it possible to extract a desired polarized component efficiently at a position immediately below the first polarizer 23A. As a result, the transmitted light amount of the polarized component with respect to the first polarizer 23A is increased, thereby making it possible to largely contribute to enhancing the front luminance.

Meanwhile, even if the transmission axis of the first polarizer 23A is slightly inclined from the low refractive index axes of the prism sheets 29A, 29B for purposes other than luminance enhancement, such as contrast enhancement as the liquid crystal display panel, the advantageous effects of the present application will not be lost. However, since the luminance enhances with decreasing angle made between the low refractive index axes of the prism sheets 29A, 29B and the transmission axis of the first polarizer 23A, it is desirable to set the angle at from 0 to 45 degrees, preferably from 0 to 20 degrees, or more preferably from 0 degree, i.e., the low refractive index axes of the prism sheets 29A, 29B are more preferably disposed almost parallel to the transmission axis of the first polarizer 23A.

Second Embodiment

In the above-described first embodiment, the light emitter 24 from which an unpolarized backlight's light emerges is used as the surface emitting device 33. However, the light emitter 24 may be replaced with a light emitter for emitting a light which deviates from a linear polarization state. For example, in "APPLIED OPTICS, Vol. 43, No. 24, 20 Aug. 2004", a configuration is disclosed in which emergent light is polarized by bonding a film having refractive index anisotropy to microstructures on a light emergent surface of a lightguide plate. The "surface emitting device" used herein refers to a light emitter for emitting a light which has polarization state whose intensity in the maximum direction is greater than one in the direction perpendicular to the maximum direction. By forming a light emitter as shown in, e.g., FIG. 9 while utilizing this principle, a polarized component oscillating in the direction of the transmission axis (direction of the low refractive index side optical axes of the first and second prism sheets 29A, 29B) of the first polarizer 23A can emerge preferentially, thereby further increasing the light utilization efficiency to enhance the front luminance. In order to achieve front luminance and viewing angle dependence of brightness suitable for the intended use, only one prism sheet may suffice, depending on the situation.

Figure 9:
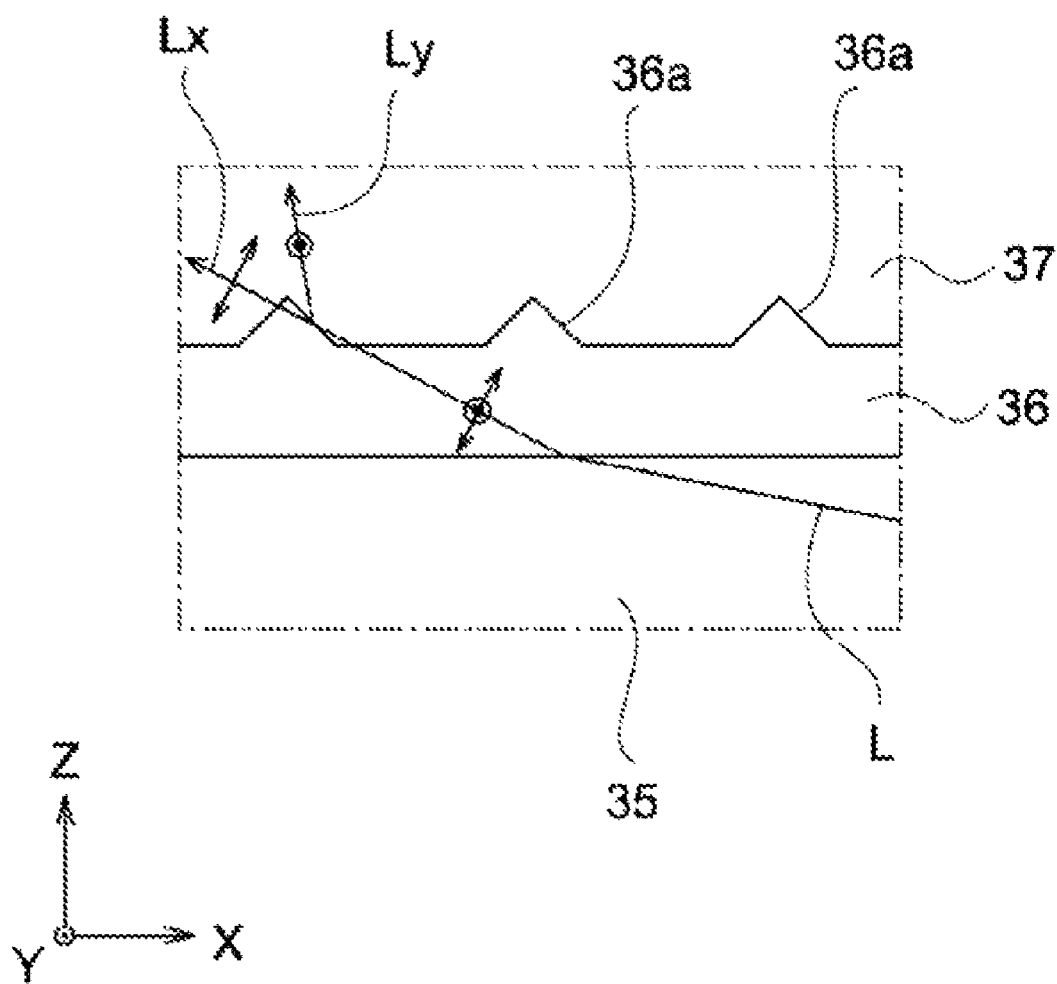
FIG. 9 is a schematic side view of a main portion of a surface emitting device according to a second embodiment.

FIG. 9 shows a schematic configuration of a light emitter having polarization selectivity. The surface emitting device has a configuration in which a structural layer 36 having microprisms 36a discretely arrayed is disposed on a light emergent surface of a lightguide plate 35, and further a surface of the structural layer 36 is covered with a birefringent layer 37. An oblique surface of each microprism 36a is set to an appropriate angle (Brewster's angle) such that the polarized component Lx oscillating in the X-axis direction is transmitted and the polarized component Ly oscillating in the Y-axis direction reflects. Accordingly, by forming this surface emitting device such that the direction of oscillation of the polarized component Ly coincides with the direction of the transmission axis of the first polarizer 23A, backlight's light may be generated which contain more polarized component Ly in terms of the amount of light.

Furthermore, a light emitter directly emitting polarized light may be used as the light emitter 24. For example, Japanese Unexamined Patent Application Publication No. 2006-228861 discloses a light emitter which emits polarized light by aligning molecules in an organic EL element. Furthermore, "Applied Physics Letters, Vol. 87, 243503/2005" reports an organic EL element which emits polarized light by aligning polyfluorene molecules. In any case, by aligning the low refractive index axes of the first and second prism sheets 29A, 29B with the direction of polarization of this polarized light, and further by aligning the transmission axis of a polarizer therewith, the light utilization efficiency may be further increased to enhance the front luminance. In order to achieve front luminance and viewing angle dependence of brightness suitable for the intended use, only one prism sheet may suffice, depending on the situation.

Third Embodiment

Figure 10:
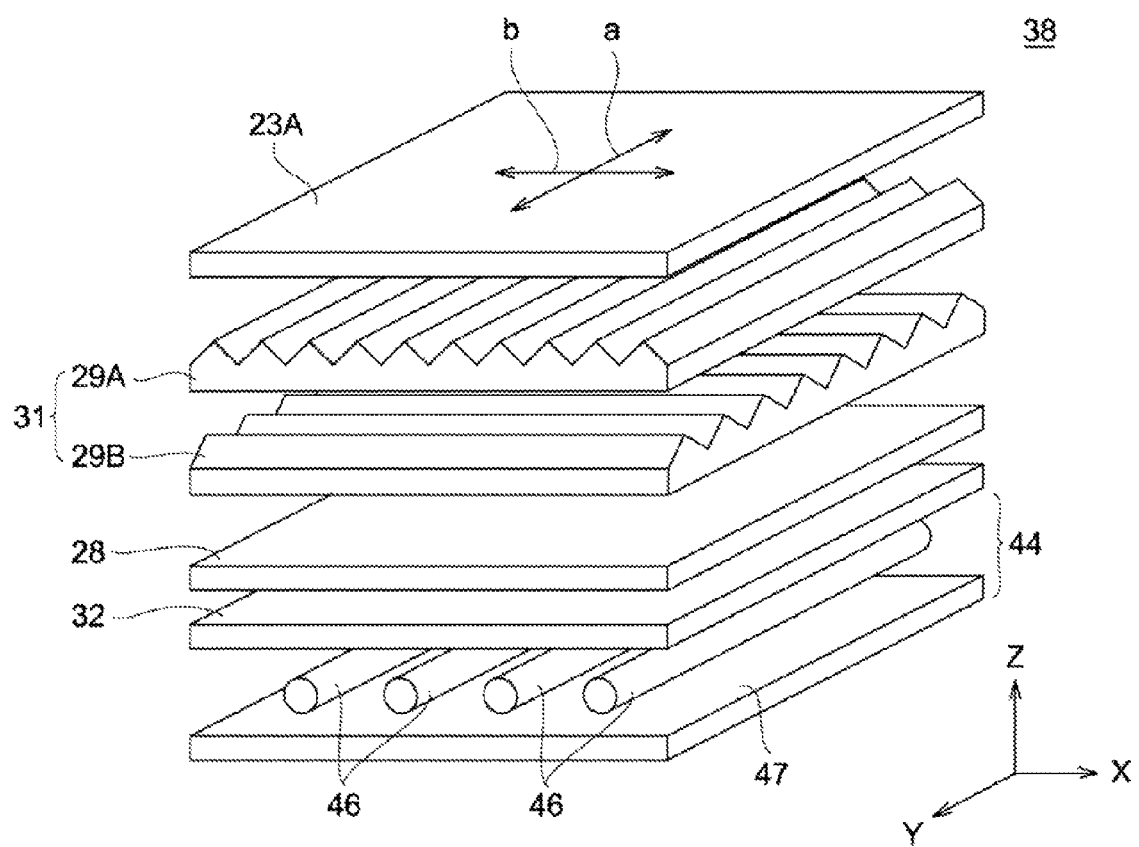
FIG. 10 is a perspective view showing a schematic configuration of a surface emitting device according to a third embodiment.

Referring continuously to FIG. 10, a third embodiment will be described. FIG. 10 is a perspective view schematically showing a configuration of a surface emitting device 38 according to a third embodiment. Parts corresponding to those of the first embodiment are given the same reference numerals, and the detailed description will be omitted.

The surface emitting device 38 of an embodiment includes a light emitter 44, a diffuser plate 32, a diffuser sheet 28, an optical sheet combination 31, and a first polarizer 23A disposed on the light incident side of a liquid crystal display panel (not shown).

The light emitter 44 is constructed of a direct type backlight unit which includes a plurality of linear light sources 46 being fluorescent tubes (CCFLs) and a reflector plate 47. The optical sheet combination 31 is composed of the first prism sheet 29A and the second prism sheet 29B, similarly to that of the first embodiment.

In an embodiment, the first prism sheet 29A is disposed between the second prism sheet 29B and the polarizer 23A, as shown in FIG. 4. The first prism sheet 29A is formed such that its refractive index in the prism extension direction is smaller than its refractive index in the prism array direction. Furthermore, the second prism sheet 29B is formed such that its refractive index in the prism extension direction is greater than the refractive index in the prism array direction. The first and second prism sheets 29A and 29B are disposed such that optical axes (low refractive index side optical axes) along which the refractive index is smaller of the in-plane anisotropic optical axes are oriented almost parallel to the polarization axis a of the polarizer 23A.

In the surface emitting device 38 of the present embodiment, the first prism sheet 29A has the refractive index (ny) in the prism extension direction smaller than the refractive index (nx) in the prism array direction, and the prism extension direction is disposed almost parallel to the transmission axis a of the first polarizer 23A. In the present embodiment, denoting, as nz, a refractive index (third refractive index) in a direction of an optical axis (third optical axis) parallel to the thickness direction of the first prism sheet 29A, the first optical sheet 29A is formed such that nz>ny.

Also in the present embodiment, advantageous effects similar to those in the first embodiment as described above can be obtained. According to the present embodiment in particular, the first prism sheet 29A has the refractive index (nz) in its thickness direction greater than the refractive index (ny) in the prism extension direction, thereby making it possible to increase the front luminance and the light extraction efficiency, when compared with a case of, e.g., nz=ny. It may suffice that nz is greater than ny, and nz can be set substantially equal to, e.g., the refractive index in the prism array direction (nz=nx).

EXAMPLES

Example 1

Figure 11:
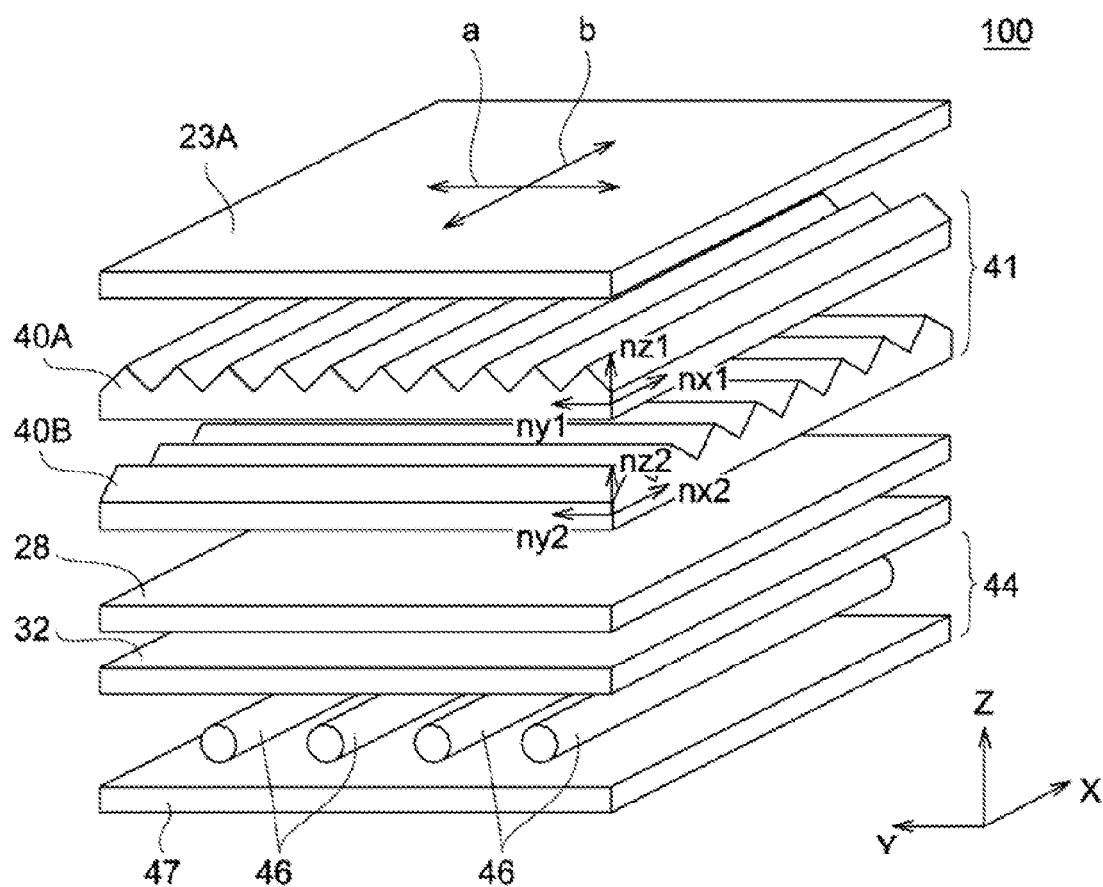
FIG. 11 is a perspective view showing a schematic configuration of a surface emitting device according to an embodiment.
Figures 13, 14:
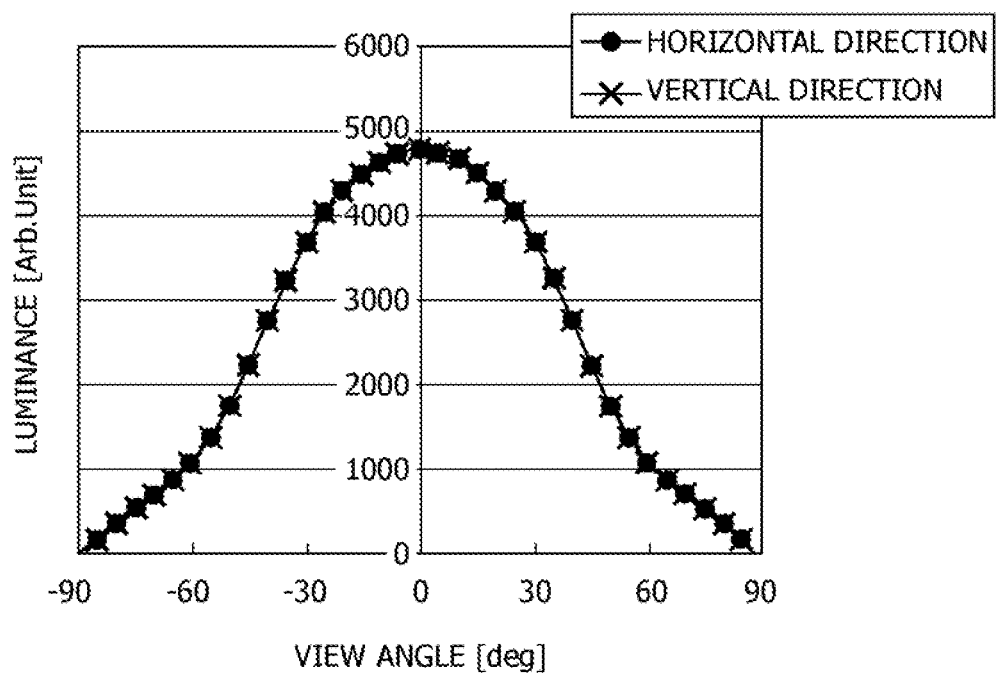
FIG. 13 is a diagram showing a luminance angle distribution of the surface emitting device of FIG. 12.
FIG. 14 is a diagram showing simulation conditions for the surface emitting device of FIG. 11.

A simulation model for a surface emitting device 100 shown in FIG. 11 was formed. Refractive indices in three axial directions of each of two prism sheets 40A, 40B forming an optical sheet combination 41 were set as shown in FIG. 14. The respective samples were calculated as to the front luminance and extraction efficiency for light emerging from the first polarizer 23A.

In FIG. 11, parts corresponding to those in FIG. 10 are denoted by the same reference numerals. In the following description, the prism sheet 40A positioned on a polarizer 23A side is called "first prism sheet", and the prism sheet 40B positioned on a diffuser sheet 28 side is called "second prism sheet".

The respective first and second prism sheets 40A, 40B are formed of a prism in which a spatial structure formed on the light emergent surface is triangular in cross section. The prism sheets 40A, 40B are disposed such mat extension directions of the prisms are orthogonal to each other. The prism array direction of the first prism sheet 40A is disposed almost parallel to the transmission axis a of the polarizer 23A. A direct type backlight unit is used as the light emitter 44, and the diffuser sheet 28, the diffuser plate 32, and the reflector plate 47 are those typically used for ordinary liquid crystal television sets. In addition, the polarizer 23A has ideal characteristics capable of transmitting polarized light in the transmission axis (a) 100%, and absorbing polarized light in the absorption axis (b) 100%.

Figure 12:
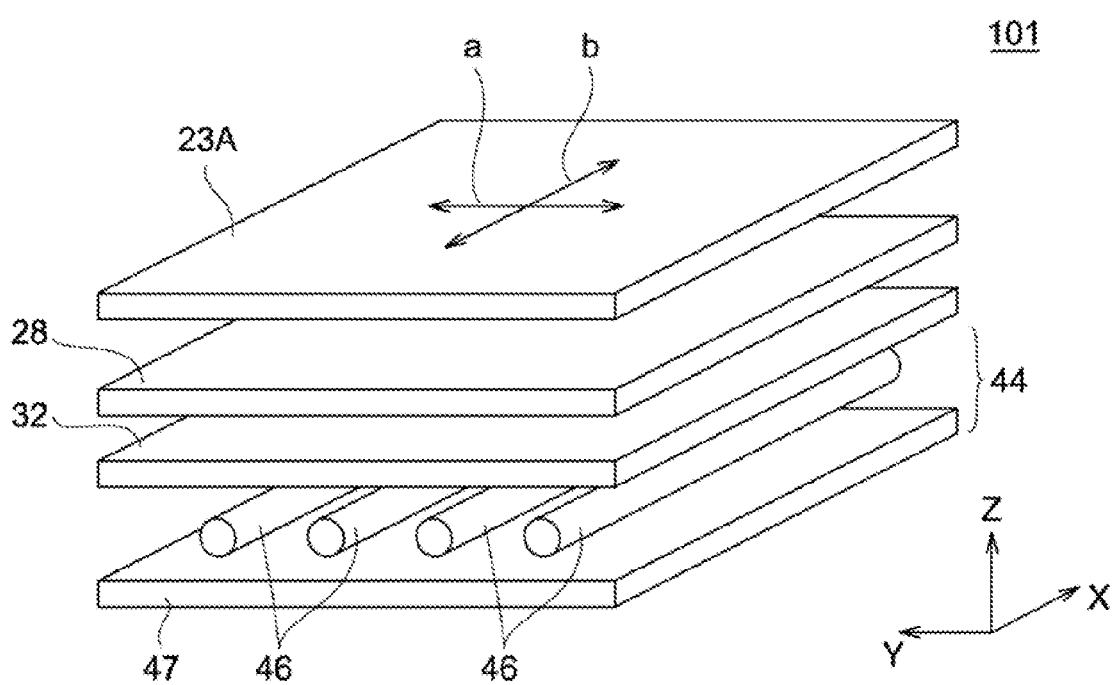
FIG. 12 is a perspective view showing a schematic configuration of a surface emitting device according to a comparative embodiment for evaluating an embodiment.

FIG. 12 is a simulation model for a surface emitting device 101 used as a reference for evaluation. The surface emitting device 101 corresponds to a configuration in which the optical sheet combination 41 is not provided in the surface emitting device 100 shown in FIG. 11. A luminance angle distribution in the simulation model of FIG. 12 is shown in FIG. 13. In the luminance angle distribution, the X-axis direction and the Y-axis direction in FIG. 12 are shown as a horizontal direction (Horizontal) and a vertical direction (Vertical), respectively. The extraction efficiency for light at this time was 50%. The "extraction efficiency" used herein refers to a ratio of the amount of light emerging from a surface emitting device to the amount of light radiated by a light source when the latter amount of light is supposed to be 100%.

Typical four cases (cases 1 to 4) shown in FIG. 14 were set as to in-plane refractive indices (nx, ny) of the prism sheets 40A, 40B. The case 1 corresponds to a case (nx1=ny1, nx2=ny2) where the two prism sheets 40A, 40B each are isotropic with respect to refractive index. The cases 2 and 3 correspond to a case where the respective two prism sheets 40A, 40B have refractive index anisotropy, and a direction along which the refractive index is smaller in only one of the prism sheets extends almost parallel to the transmission axis of the polarizer 23A. The case 4 is a case where the respective two prism sheets 40A, 40B have refractive index anisotropy, and directions along which their respective refractive indices are smaller extend almost parallel to the transmission axis of the polarizer 23A.

Figure 15:
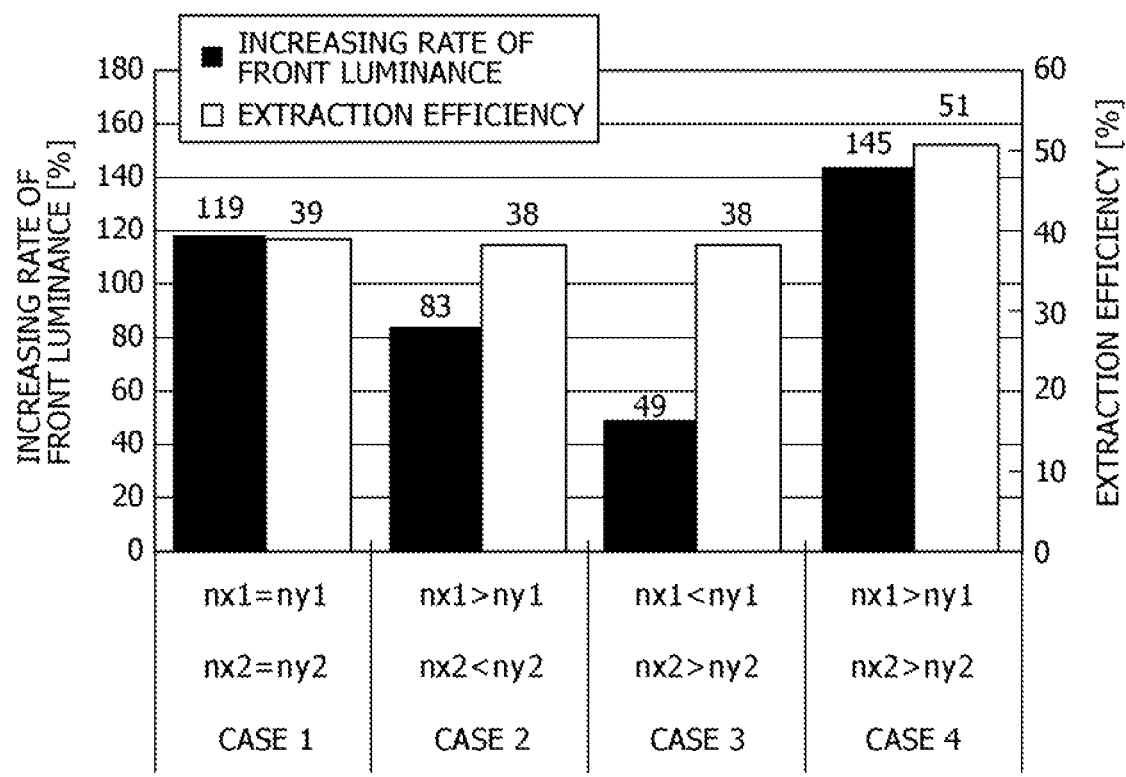
FIG. 15 is a diagram showing simulation results on the surface emitting device of FIG. 11.

For the cases 1 to 4, the front luminance increasing rate and light extraction efficiency in the surface emitting device 100 were measured using the front luminance obtained by the surface emitting device 101 as a reference. The results are shown in FIG. 15. It is noted that simulation conditions for the cases 1 to 4 were the same as those for the surface emitting device 101.

From the results shown in FIG. 15, it is found out that the case 4, where the directions along which the refractive indices are smaller in the in-plane optical anisotropy of the two prism sheets 40A, 40B are aligned with the transmission axis of the polarizer, exhibits the highest front luminance increasing rate and light extraction efficiency. Meanwhile, the cases 2 and 3 exhibit results even inferior to those in the case 1 where two isotropic prism sheets were used.

As is apparent from the above results, it is confirmed that the direction of smaller one of the refractive indices in the in-plane optical anisotropy both the two prism sheets 40A, 40B constituting the optical sheet combination 41 arranges almost parallel to the transmission axis of the polarizer 23A.

Example 2

Simulations were made as to a relationship between the transmission axis a of the polarizer 23A and the prism extension direction of the first prism sheet 40A and effects of the refractive indices in the thickness direction of the two prism sheets 40A, 40B.

Figure 16:
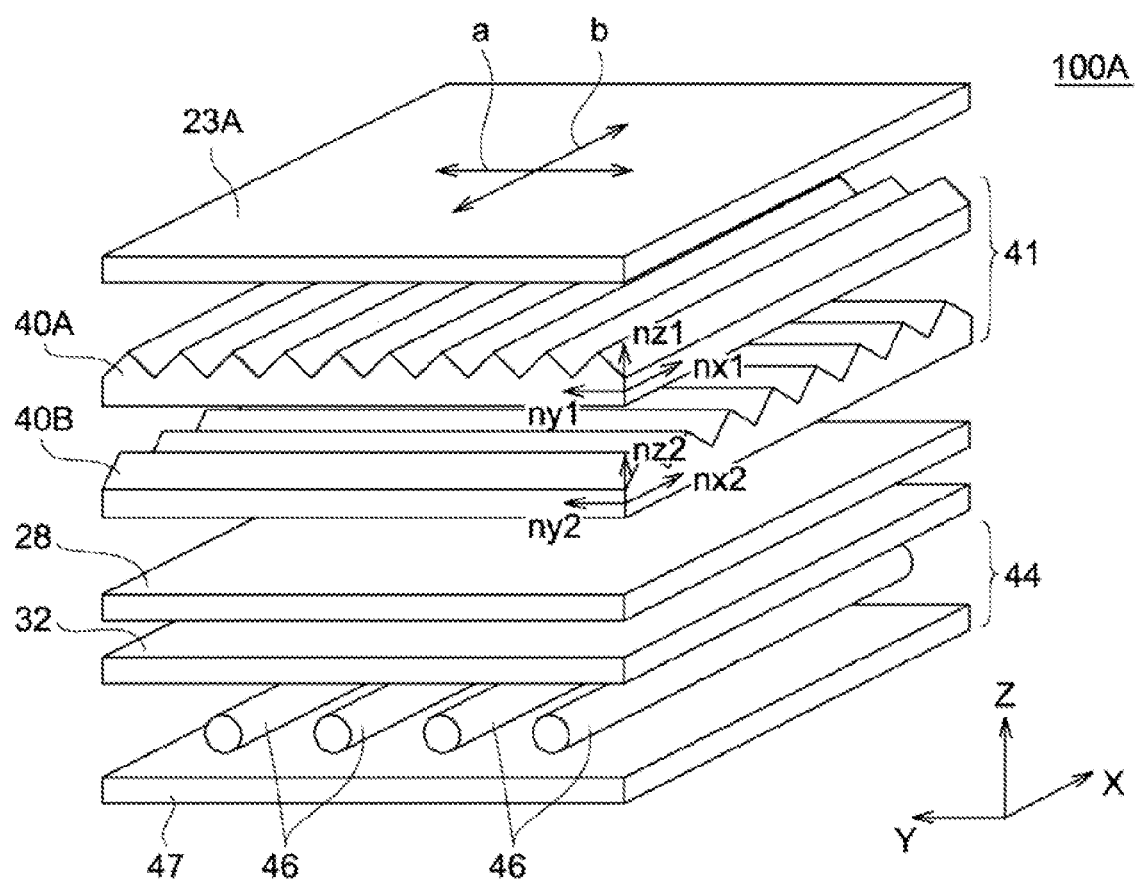
FIG. 16 is a perspective view showing a schematic configuration of a surface emitting device according to an another example.
Figure 17:
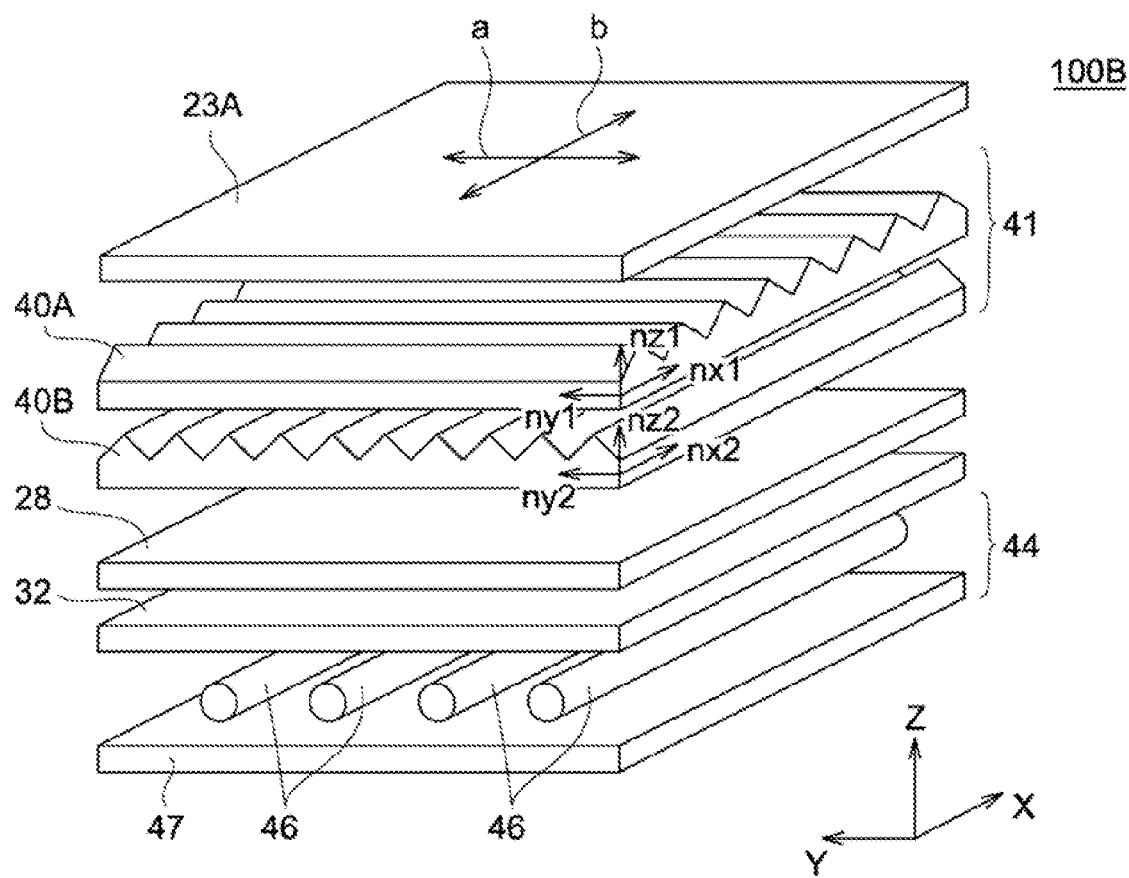
FIG. 17 is a perspective view showing a schematic configuration of a surface emitting device according to a still another example.
Figure 19:
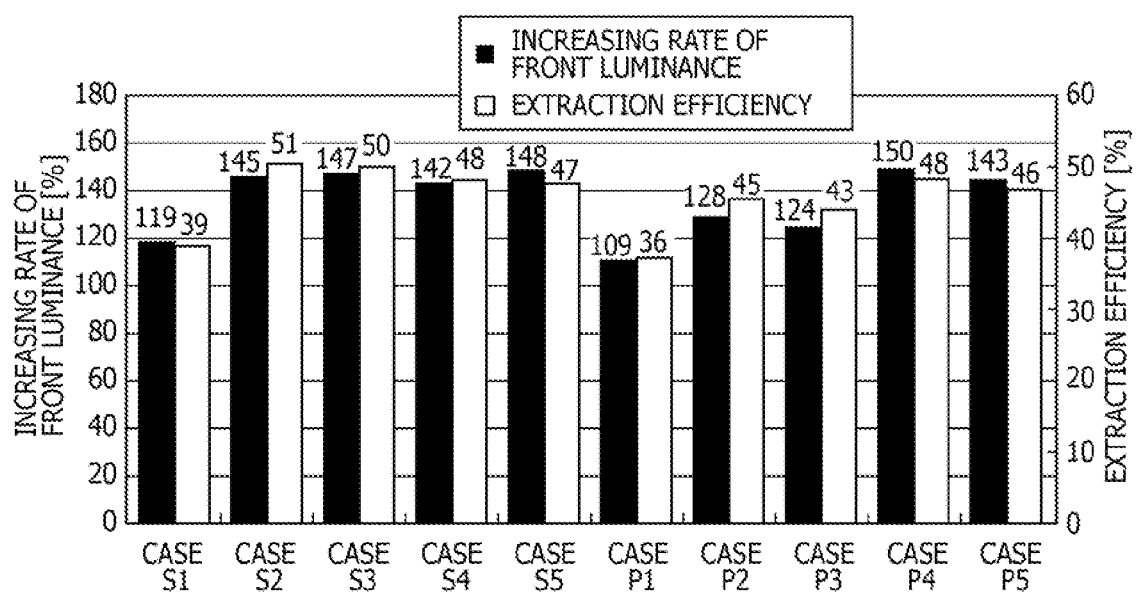
FIG. 19 is a diagram showing simulation results on the surface emitting devices of FIGS. 16 and 17.

The relationship between the transmission axis a of the polarizer 23A and the prism extension direction of the first prism sheet 40A is considered for two typical cases, i.e., a case where they are vertical as in a surface emitting device 100A shown in FIG. 16 and a case where they are parallel as in a surface emitting device 100B shown in FIG. 17. Furthermore, in order to consider the effects of the refractive indices nz in the thickness direction of the two prism sheets 40A, 40B, a simulation was made for cases (S1 to S5, P1 to P5) shown in FIG. 18. Measurements were made as to the front luminance increasing rate and the light extraction efficiency for the surface emitting devices 100A, 100B using the front luminance obtained by the surface emitting device 101 as a comparative example shown in FIG. 12, as a reference. The results are shown in FIG. 19. It is noted that simulation conditions for the cases S1 to S5, P1 to P5 were the same as those for the surface emitting device 101.

The cases S1 and P1 correspond to a case (nx1=ny1, nx2=ny2) where the respective two prism sheets 40A, 40B are isotropic with respect to refractive index, whereas the rest of the cases all correspond to a case where the two prism sheets 40A, 40B have optical axis anisotropy satisfying a condition of nx>ny. Particularly, the first prism sheet 40A satisfies a relationship of nx>nz in the cases S2, S3, P2, and P3, whereas it satisfies a relationship of nx≠nz in the cases S4, S5, P4, and P5. Meanwhile, the second prism sheet 40B satisfies the relationship of nx>nz in the cases S2, S4, P2, and P4, whereas it satisfies the relationship of nx=nz in the cases S3, S5, P3, and P5.

As is understood from a comparison of the cases S2 to S5, in the case (FIG. 16) where the transmission axis a of the polarizer 23A and the prism extension direction of the first prism sheet 40A are vertical, a level of dependency on the refractive indices nz1 and nz2 in the thickness direction of the prism sheets 40A, 40B is small, thereby sufficiently enhancing the front luminance.

Also, as is understood from comparisons between the cases P2 and P4, and between P3 and P5, where the transmission axis a of the polarizer 23A and the prism extension direction of the first prism sheet 40A are parallel, a level of dependency on the refractive index nz1 in the thickness direction of the first prism sheet 40A is great, and thus when nz1 is great, the front luminance can be enhanced. Meanwhile, as is understood from comparisons between the cases P2 and P3, and between P4 and P5, a level of dependency on the refractive index nz2 in the thickness direction of the second prism sheet 40B is not so great, but when this value is smaller, the front luminance can be enhanced.

From the above results, when the transmission axis a of the polarizer 23A and the prism extension direction of the first prism sheet 40A are parallel, it has been confirmed that it is better to increase the refractive index nz1 in the thickness direction of the first prism sheet 40A, whereas it is confirmed that the refractive index nz2 in the thickness direction of the second prism sheet 40B may be either small or great.

While embodiments of the present application have been described in the foregoing, the present application is not limited to these embodiments, but can be modified in various and suitable ways.

For example, in the first embodiment, two anisotropic prism sheets are used in forming the optical sheet combination 30. However, by increasing the number of the sheets, it becomes possible to further enhance the polarization split characteristics of backlight rays.

Furthermore, in the surface emitting device 33 of the first embodiment, the light emitter 24 is composed of an edge light type backlight unit. However, this light emitter 24 may be replaced with a direct, type backlight unit such as described in the second embodiment. Similarly, in the surface emitting device 38 of the second embodiment, the light emitter 44 is composed of a direct type backlight unit. However, this light emitter 44 may be replaced with an edge light type backlight unit such as described in the first embodiment.

Furthermore, in the above embodiments, drawing is used to make the effect of the refractive index anisotropy in the first and second prism sheets 39A, 29B. However, other embodiments may also be applicable in which each of the prism sheet exhibits the refractive index anisotropy between the prism extension direction and the prism array direction, e.g., by aligning a liquid crystal material having refractive index anisotropy, or by forming prism sheets or prisms (spatial structure) using a crystalline material having refractive index anisotropy.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A surface emitting device comprising:
   a light emitter;
   a polarizer having a transmission axis along which light emerging from the light emitter is transmitted; and
   an optical sheet combination disposed between the light emitter and the polarizer and composed of a plurality of optical sheets,
   each of the plurality of optical sheets including:
   an emergent surface for causing the emergent light to emerge therefrom,
   a spatial structure continuously arrayed on the emergent surface,
   a first optical axis parallel to an extension direction of the spatial structure and having a first refractive index, and
   a second optical axis parallel to an array direction of the spatial structure and having a second refractive index different from the first refractive index, wherein the first or second optical axis of a smaller one of the first and second refractive indices extends almost parallel to the transmission axis of the polarizer.

2. The surface emitting device according to claim 1, wherein the optical sheet combination includes:
a first optical sheet in which the first refractive index is smaller than the second refractive index; and
a second optical sheet in which the first refractive index is greater than the second refractive index.

3. The surface emitting device according to claim 2, wherein the respective first and second optical sheets are composed of a resin sheet drawn in the extension direction of the spatial structure.

4. The surface emitting device according to claim 3, wherein:
the first optical sheet is formed of a resin sheet in which the refractive index is smaller in a drawing direction; and
the second optical sheet is formed of a resin sheet in which the refractive index is greater in the drawing direction.

5. The surface emitting device according to claim 4, wherein the first optical sheet is formed of a resin material selected from a group consisting of methacrylic resins, polystyrene resins, styrene-methyl methacrylate copolymers, and mixtures thereof.

6. The surface emitting device according to claim 4, wherein the second optical sheet is formed of a resin material selected from a group consisting of Polyethylene Terephthalate, Polyethylene Naphthalate, mixtures thereof, and copolymers thereof.

7. The surface emitting device according to claim 2, wherein the second optical sheet is disposed between the first optical sheet and the polarizer.

8. The surface emitting device according to claim 2, wherein the first optical sheet is disposed between the second optical sheet and the polarizer, and has a third refractive index of an optical axis parallel to a thickness direction and greater than the first refractive index of the first optical sheet.

9. The surface emitting device according to claim 8, wherein the third refractive index is substantially equal to the second refractive index of the first optical sheet.

10. The surface emitting device according to claim 9, wherein the first optical axis of the first optical sheet is almost parallel to the transmission axis of the polarizer.

11. The surface emitting device according to claim 1, wherein the spatial structure is a prism or a lenticular lens.

12. The surface emitting device according to claim 11, wherein the spatial structure is formed of a birefringent liquid crystal material.

13. A liquid crystal display comprising:
a liquid crystal display panel;
a light emitter for illuminating the liquid crystal display panel;
a first polarizer disposed on a light incident side of the liquid crystal display panel and having a transmission axis along which light emerging from the light emitter is transmitted;
a second polarizer disposed on a light emergent side of the liquid crystal display panel; and
an optical sheet combination disposed between the first polarizer and the light emitter and composed of a plurality of optical sheets, each of the plurality of optical sheets including:
an emergent surface for causing the emergent light to emerge,
a spatial structure continuously arrayed on the emergent surface,
a first optical axis parallel to an extension direction of the spatial structure and having a first refractive index, and
a second optical axis parallel to an array direction of the spatial structure and having a second refractive index different from the first refractive index, wherein the first or second optical axis of a smaller one of the first and second refractive indices extends almost parallel to the transmission axis of the polarizer.

14. A surface emitting device comprising:
a light emitter for emitting a light which has polarization state whose intensity in the maximum direction is greater than one in the direction perpendicular to the maximum direction;
a polarizer having a transmission axis along which the light emerging from the light emitter is transmitted; and
an optical sheet combination disposed between the polarizer and the light emitter and composed of a plurality of optical sheets, each of the plurality of optical sheets including:
an emergent surface for outgoing the emitted light,
a spatial structure continuously arrayed on the emergent surface, a first optical axis parallel to an extension direction of the spatial structure and having a first refractive index, and
a second optical axis parallel to an array direction of the spatial structure and having a second refractive index different from the first refractive index, wherein the first or second optical axis of a smaller one of the first and second refractive indices extends almost parallel to the transmission axis of the polarizer.

15. An optical sheet combination, comprising:
a plurality of optical sheets each including:
an emergent surface for causing an emergent light from a light emitter;
a spatial structure continuously arrayed on the emergent surface;
a first optical axis parallel to an extension direction of the spatial structure and having a first refractive index; and
a second optical axis parallel to an array direction of the spatial structure and having a second refractive index different from the first refractive index,
wherein the first or second optical axis along of a smaller one of the first and second refractive indices extends almost parallel to a transmission axis along which light emerging from the light emitter is transmitted.

* * * * *